(12) United States Patent
Vermeulen

(10) Patent No.: US 6,862,607 B1
(45) Date of Patent: Mar. 1, 2005

(54) METHOD TO PROVIDE INFORMATION IN AN INTERNET TELECOMMUNICATION NETWORK

(75) Inventor: Christophe Daniel Ghislain Vermeulen, Roclenge sur Geer (BE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/440,200

(22) Filed: Nov. 15, 1999

(30) Foreign Application Priority Data

Oct. 28, 1999 (EP) .............................................. 99402691

(51) Int. Cl.⁷ .......................................... G06F 15/167
(52) U.S. Cl. ..................... 709/213; 709/216; 709/218; 709/203; 725/96; 370/229; 370/237
(58) Field of Search ................................ 709/213, 216; 711/133, 137, 202

(56) References Cited

U.S. PATENT DOCUMENTS

| | | | | |
|---|---|---|---|---|
| 5,950,205 A | * | 9/1999 | Aviani, Jr. .............. | 707/103 R |
| 6,026,474 A | * | 2/2000 | Carter et al. ................. | 707/10 |
| 6,085,193 A | * | 7/2000 | Malkin et al. ................ | 707/10 |
| 6,128,701 A | * | 10/2000 | Malcolm et al. ............ | 711/133 |
| 6,393,526 B1 | * | 5/2002 | Crow et al. ................. | 709/213 |

OTHER PUBLICATIONS http://www.isoc.org/inet96/proceedings/a4/a4_3.htm.*
Dias, G. V. and Cope, G. and Wijayaratne, R.: "A Smart Internet Caching System" INET' 96, Online! vol. A4, Jun. 25–28, 1996, pp. 1–21, XP002086721, Montreal Canada, Retrieved from the Internet <URL:http//www.isoc.org/inet/inet96/proceedings/a4/a4_3.htm retrieved on Feb. 12, 1998.
Nabeshima, M.: "The Japan Cache Project: an experiment on domain cache" Computer Networks and ISDN Systems, NL, North Holland Publishing. Amsterdam, vol. 29, No. 8–13, Sep. 1, 1997, and pp. 987–995, XP004085297.
Bestavros, A.: "Speculative Data Dissemination and Service" Data Engineering, US, IEEE, Silver Spring, MD, Jan. 1, 1996, pp. 180–187, XP000764867.
W. Richard Stevens, TCP/IP Ulustrated, vol. 1: The Protocols, ISBN 0–201–63346–9, Feb. 1998, Chapter 30—Other TCP/IP Appli.

* cited by examiner

Primary Examiner—Ayaz Sheikh
Assistant Examiner—Syed A. Zia
(74) Attorney, Agent, or Firm—Sughrue Mion, PLLC

(57) ABSTRACT

The invention concerns a method to provide information (INF) in an Internet telecommunication network from a server (S) to a terminal (T) of a user. The method comprises the steps of requesting with a frame information request (REQ_Fr) by the terminal (T) to the server (S) for transmission of frame information (Fr). The frame information (Fr) is in the information (INF) and comprises itself least one reference to referred information (Ref) of the information (INF). Upon reception of said the information request (REQ_Fr) the step of transmitting the frame information (Fr) to the terminal (T) is executed. The method further comprises reacting upon reception of the frame information request (REQ_Fr) also by commanding transmission of at least the referred information (Ref) according to the reference. This referred information (Ref) is commanded to be transmitted to a memory means (MEM) via a channel that is different from the one that is used for transmission of the frame information (Fr). A further step of the method is receiving the referred information (Ref) by the memory means (MEM) via the other channel. Hereby, in the event when the terminal (T) received at least part of the frame information, the terminal (T), which is associated to the memory means (MEM), is enabled to find the referred information (Ref) according to the reference in the frame information, at the location of the memory means (MEM) when requesting for it.

10 Claims, 1 Drawing Sheet

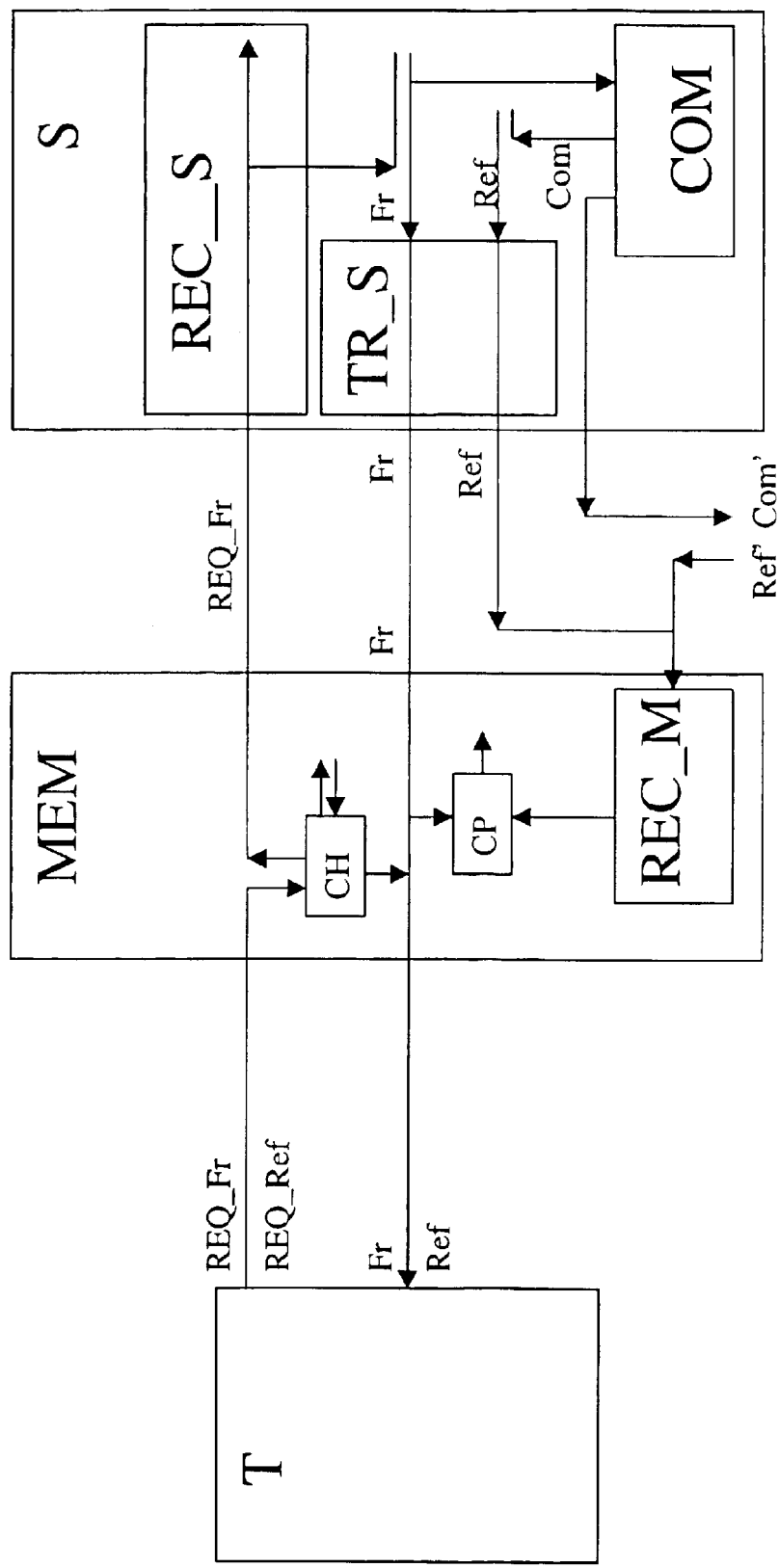
Figure

METHOD TO PROVIDE INFORMATION IN AN INTERNET TELECOMMUNICATION NETWORK

BACKGROUND OF THE INVENTION

The present invention relates to a method to provide information in an Internet telecommunication network from a server to a terminal a server and a memory means realizing such a method respectively, and an Internet telecommunication network.

Such a method to provide information from a server to a terminal is already known in the art. Indeed, one of the best known applications on the Internet today is the world wide web. The web was originally designed as a collection of pages that refer to additional information instead of copying the additional information into the pages. This is also described in the book 'TCP/IP Illustrated, Volume 1: The Protocols' written by W. Richard Stevens and published by Way, Reading, Mass. 01867, with reference number ISBN 0-201-63346-9, 11th printing February, 1998. In Chapter 30, 'Other TCP/IP Applications' describes additional TCP/IP applications supporting many implementations. Paragraph 30.4 of this chapter lists tools that exist to locate files and documents. The World Wide Web permits browsing of a large, worldwide set of services and documents using a tool called hypertext. Information is displayed comprising certain keywords that are highlighted. A selection of one of the keywords provides more information on those keywords. Indeed, the reference can be on any other host connected to the Internet with a web server application running on it. The reference is of the form of an URL Uniform Resource Locator that is placed into the web page. The user just has to select this URL after which the web application on his local host makes a connection with the new web server and downloads the required file.

Thanks to the definition of Hypertext Markup Language HTML, publishers are allowed to specify the layout of the text. It is therefore up to the application itself to do the interpretation of the downloaded files and to present them in an appropriate way.

An application to download such Hypertext Markup Language page is Hypertext Transfer Protocol HTTP, which is a protocol with very simple commands. In e.g. a GET command only the file and the path indication are mentioned.

As it is clear from Chapter 30 of the above mentioned book, the use of Internet of HyperText Transfer Protocol HTTP is usual over the known Transmission Control Protocol over the known Internet Protocol TCP/IP.

The performance of Transmission Control Protocol over Internet protocol TCP/IP is however limited by connection set-up. Indeed, when a user requests an HTML-page from a server via its browser, usually different files are to be transferred from the server to the user. Besides e.g. a text file also other files such as e.g. image files, style sheet files, etc. are to be transferred.

It has to be explained here that such an HTML page is referred to in the claims as 'information'. Another implementation of 'providing information' is realized with resource description framework RDF.

First frame information is downloaded e.g. a text file for HTML or a Document for RDF. This frame information is transmitted to the terminal upon reception by the server of a frame information request that is forwarded by the terminal. Such frame information comprises references towards other information, in the claims referred to as 'referred information' e.g. a reference to a style sheet file of such a text file for HTML-page applications or a reference to a resource of such a framework for resource description framework application.

In the event of e.g. an HTML-page downloading application, as soon as a text-file is transmitted by the server to the browser, different other files are transmitted from the server to the browser upon requests of the browser. In this way, one connection is required for each file, which means that each file requires the overhead of a connection set-up. An improvement is reached by reusing a connection sequentially for the same HTML-page but for different files i.e. "keep alive" concept. However, the number of connections is not optimized as it is predefined in the browser.

It has to be remarked here that the mentioned actions of the terminal are usually executed by a browser installed on the terminal. In this way, a not limited list of steps is provided hereby to give some idea how a web browser works in the event when a user clicks on a link of an HTML page:

the browser determines a Uniform Resource Locater URL; and the browser asks e.g. a domain name server to translate the URL into an Internet protocol address IP; and the domain name server replies with an IP address; and the browser establishes a Transfer Control Protocol connection to, usually, port 80, using this IP address; and the server is listening to this port and acknowledges this connection request; and the browser then sends an Hypertext Transfer Protocol GET request to retrieve the file; and the server sends a text file and for instance related image files to which the text file is referring; and the Transfer Control Protocol connection might be released; and the browser interprets the Hypertext Mark Up Language HTML information and displays the page in the window of the terminal.

If this page contains a link to an embedded object e.g. an image or a JAVA applet, the same mechanism is repeated.

If this page contains a link to a page of another server also this mechanism is repeated to this server as soon as the user clicks on the link.

SUMMARY OF THE INVENTION

An object of the present invention is to download information in an Internet telecommunication network from a server to a terminal, such as the above known method but which decreases the required number of connections.

This and other objects are achieved in accordance with the invention by a method of providing information (INF) in an internet telecommunication network from a server (S) to a terminal (T) of a user, said method comprising the steps of sending a frame information request (REQ_Fr) from said terminal (T) to said server (S) requesting transmission of frame information (Fr) included in said information (INF), said frame information (Fr) comprising at least one reference to referred information (Ref) of said information (INF), and upon reception of said frame information request (REQ_Fr) transmitting said frame information (Fr) to said terminal (T), characterized in that said method further comprises the steps of reacting upon reception of said frame information request (REQ_Fr) also by commanding transmission of at least said referred information (Ref) according to said reference to a memory (MEM) via a channel other than the one being used for transmission of said frame information (Fr), and by receiving said referred information (Ref) by said memory (MEM) via said channel, thereby enabling said terminal (T) which is associated with said memory (MEM) to find said referred information (Ref) with said memory (MEM) when requesting said memory (MEM) for said referred information (Ref) after having received at least part of said frame information (Fr).

In accordance with further aspects of the invention there are provided a server and memory for realizing this method, and an internet telecommunication network comprising such a server and memory.

Indeed, the server reacts upon reception of a frame information request by not only transmission of the frame information but also by commanding transmission of the referred information according to the references comprised in the frame information. The transmission of the referred information is performed via a channel that is different from the channel that is used for transmission of the frame information. The referred information is transmitted to a memory means with which the terminal is associated. In this way when the terminal received at least part of the frame information and when it found out in this frame information the reference of the referred information, the terminal is enabled to find this referred information by requesting the memory means for it.

The server comprises commanding means to generate a command, upon reception of the frame information request. This command is an order for transmission of the referred information according to the reference to the memory means and via a channel different from the one used for transmission of the frame information. In this way, the connection of the request for frame information is permitted to be released after transmission of the frame information since the referred information is to be transmitted via the other channel. Furthermore no extra request for referred information is to be generated by the terminal to the server, since the server already took the necessary measures to provide the referred information to the memory means with which the terminal is associated. It has to be remarked here that, as already mentioned above, not only one reference is usually comprised in such frame information, which makes that not only one request for referred information is saved. Hereby it is clear that the method according to the present invention is adapted to a use for asymmetric bandwidth access networks such as Asymmetric Digital Subscriber Line ADSL networks, Satellite communication networks or Hybrid Fiber coax networks. Indeed, the browsers of a terminal in such a network don't have to request transmission of all the referred files anymore.

Referring to the above mentioned application of Hypertext Transfer Protocol over Transfer Control Protocol HTTP/TCP and in the event of using for the other channel a User Datagram Protocol UDP and when also implementing the memory means by e.g. the cache memory of the browser, it is clear that the required number of connections is decreased by replacing the TCP layer by the User Data Protocol UDP layer whenever possible and by using the cache concept of the browser. While the server transmits the HTML-text file on top of TCP it also transmits the other files simultaneously on top of UDP towards the cache of the browser. The browser always interrogates first its cache upon the presence of the further files and will now find the files already there.

The memory means comprises receiving means that is adapted to receive the referred information via the other channel. Indeed, the memory means must realize that information such as the referred information should be received via another channel as it expects. The memory means expects to receive information according to the first established channel by means of e.g. the Transfer Control Protocol connection to e.g. its port number 80. Therefore, the receiving means is comprised in the memory means in order to enable the memory means to receive information via another channel that is established by means of e.g. User Datagram Protocol to e.g. this port 80 or another port.

It has to be explained here that User Datagram Protocol is usually used for e.g. rather small messages like e.g. PING and for real-time stream information where lost packets should not be repeated such as Real Audio. However, User Datagram Protocol is very efficient for small files and requires only a port number and a length indication of the file in order to transmit the information. So, in this way User Datagram Protocol is very well suited to transmit the referred information by means of User Datagram Protocol packets that contain the coded files and the file references. The realization of the other channel may be according to user Datagram Protocol.

Furthermore, it has to be remarked that the memory means stores the received referred information according to a similar way as received frame information i.e. a uniform resource locator that refers to its associated information. This will become more clear in a following paragraph.

A further remark is that a seamless integration with the prior art solution is possible by gradual implementation of commanding means in servers and receiving means in the memory means whereby transport via the other channel is executed if it is supported on both sides.

A further advantage of the method of the invention is that for related files such as the mentioned referred information that must come from different servers, the bandwidth is further optimized. Indeed, according to the prior art solution all files are requested by the browser of the terminal from a server according to the references and must be transmitted to the terminal via this server since the channel is set up via this server. Even when the referred information is coming from another server it is transmitted to the terminal via the first server or via a known redirection mechanism that requests the terminal to set up a new channel to that other server. According to the solution of the invention, a commanding means is enabled to forward a command to a second server in order to transmit the referred files via another channel directly to the memory means and not via the first predefined server.

As it is already mentioned above, a browser installed on a terminal comprises usually a cache memory. This cache memory is interrogated by the browser upon the presence of the desired information such as frame information or other referred information. The cache memory is checked for presence of the uniform resource locator URL reference of the desired information and, in the event when this URL reference is present, the associated information is provided towards the browser. In the event when the URL reference is not present in the cache memory, the browser generates such a request for frame information for the server of the URL. Furthermore, the information received by the browser from a server might be copied into this cache memory also in order to be present in the cache memory for a later interrogation. It is clear that the memory means according to the present invention can be comprised in the terminal and can be implemented by a cache memory of the browser on the terminal.

In another implementation of the memory means, the memory means is comprised in an intermediate means such as a proxy server between the terminal and the server. Such a proxy server is doing something on behalf of someone else i.e. the user. This means that, posing a request to some server, it is not answered by the one intended but by an intermediate agent. This proxy behavior is motivated when the proxy server can answer faster or for security reasons. In this way a Web proxy server is used to have a faster response and better capacity during surfing. If a page is requested several times, rather then retrieving it each time from the Internet, the page is kept locally, so if it is asked a second time, the page is loaded from the Web proxy server memory rather then from the original web server itself. The advantage for the users is that the proxy server is located on the intranet, which is typically a Local Area Network and thus nearby. The users have thus a fast connection. However, the user is not forced to use proxy servers. Towards implementation of the present invention it could be easier to adapt one memory means of a proxy server instead of each terminal of the local network.

Finally, the reception of the referred information by the memory means may be via an interface different from the one used for reception of the frame information. Indeed, an interface different from the interface for the frame information e.g. via a modem is used for reception of the referred information via a channel e.g. satellite interface or a cable television interface.

It should be noticed that the term "comprising", used in the claims, should not be interpreted as being limited to the means listed thereafter. Thus, the scope of the expression "a device comprising means A and B" should not be limited to devices consisting only of components A and B. It means that with respect to the present invention, the only relevant components of the device are A and B.

Similarly, it is to be noted that "coupled", also used in the claims, should not be interpreted as being limited to direct connections only. Thus, the scope of the expression "a device A coupled to a device B" should not be limited to devices or systems wherein an output of the device A is directly connected to an input of device B. It means that there exists a path between an output A and an input B which may be a path including other devices or means.

BRIEF DESCRIPTION OF THE DRAWING

The above and other objects and features of the invention will become more apparent and the invention itself will be best understood by referring to the following description of an embodiment taken in conjunction with the accompanying drawings wherein the FIGURE represents an Internet telecommunication network including the main devices relevant to the present invention in.

DETAILED DESCRIPTION OF THE INVENTION

The working of the method of the present invention will be explained by means of a functional description of the functional blocks shown in the FIGURE. Based on this description, implementation of the functional blocks will be obvious to a person skilled in the art and will therefor not be described in further detail.

Referring to the FIGURE an Internet Telecommunication network is shown. The network comprises a terminal T coupled to a server S via a memory MEM. For this particular embodiment it is preferred to implement the memory according to the present invention by means of a memory of a proxy server.

On the terminal T a browser is installed (not shown) in order to surf on the world wide web.

The server S comprises a server receiver REC_S coupled between an input of the server S and a server transmitter TR_S and a commander COM. The server transmitter TR_S is coupled to two outputs of the server. The commander COM is coupled to the server transmitter TR_S and to a third output of the server S. The server receiver REC_S is enabled to receive a request e.g. a frame information request REQ_Fr or a referred information request from the terminal T that was forwarded via the memory M. Upon reception of e.g. such a frame information request REQ_Fr, the server receiver REC_S reacts with a double action. The first action is to initiate the downloading of the frame information Fr and the second action is to initiate the downloading of all referred information Ref/Ref' that are referred to in the frame information Fr. The following paragraphs will only describe the further actions for the presence of a first referred information Ref and a second referred information Ref'.

Referring to the first action, the server receiver REC_S uses the URL comprised in the frame information request REQ_Fr in order to retrieve the frame information Fr from its storage and to provide this frame information Fr towards the server transmitter TR_S. The server transmitter TR_S transmits this frame information towards the terminal T.

Referring to the second action the frame information Fr is also provided to the commander COM. It has to be remarked that an alternative implementation might only provide the references themselves to the commander COM. The commander COM retrieves the references towards the referred information from the frame information and generates a command Com/Com' for each retrieved reference. According to the outlook of the reference, which is in fact also an URL, the commander COM uses a generated command Com to retrieve from the storage of the server S the associated referred information Ref or the commander COM provides a generated command Com' to a second server (not shown) to command transmission by the second server of the associated referred information Ref'.

The server transmitter TR_S transmits the frame information on top of TCP towards the memory MEM i.e. the frame information is encapsulated in one or more Transfer Control Protocol segments which are on its turn encapsulated into IP packets. Furthermore, the server transmitter TR_S transmits the referred information Ref on top of UDP towards the memory MEM i.e. the referred information Ref is encapsulated into an UDP package which is on its turn encapsulated into an IP packet.

Referring back to the second action, the second server retrieves the referred information Ref that is associated to the reference according to the received command Com' from its storage and transmits this referred information Ref' towards the memory MEM. The referred information Ref' is transmitted by the second server according to the received command Com' also on top of UDP.

The memory MEM comprises a memory receiver REC_M, a checker CH and a copier CP. The checker CH is coupled between an input and an output of the memory MEM in the upstream direction i.e. from terminal T towards server S. The copier CP is also coupled to an input of the memory that is directly downstream coupled to an output of the memory MEM. The memory receiver REC_M is coupled to an input of the memory MEM. Furthermore it is shown in the FIGURE that the checker CH and the copier CP comprise also arrows that are pointing to and from nowhere in the shown functional block for the memory MEM. These in- and outputs are in fact coupled to the storage of the memory. It has to be remarked that such storage is not necessarily comprised in the memory itself. In the event when the storage is located outside the memory, the memory is a database whereby at least a reference to the stored information in the storage is kept in the memory MEM. However, this goes beyond the aim of the present invention and is therefore not further described here in detail. In order not to overload the FIGURE, the storage is not shown and only the arrows pointing to the storage are shown.

In a similar way, and as it is shown in the FIGURE, are the server receiver REC_S, the server transmitter TR_S and the commander COM pointing to and from nowhere in the shown functional block for the server S. These in- and outputs are also coupled to a storage that is associated to the server S but which is not shown in order not to overload the FIGURE.

The checker CH is included in the memory MEM to receive a request e.g. a frame information request REQ_Fr from the terminal T. According to the included URL reference in such a request REQ_Fr, the checker CH checks the presence of the frame information Fr in the storage of the memory MEM. In the event when the frame information Fr is present in the storage of the memory MEM, the checker CH retrieves the frame information Fr and provides it to the terminal T. In the event when the frame information Fr is not present in the storage of the memory MEM the checker CH forwards the frame information request REQ_Fr to the server S.

The copier CP of the memory MEM takes a copy of received frame information Fr from the server S before it is further transmitted towards the terminal T. This copy is stored in the storage of the memory MEM with as retrieval reference the reference of the URL of the frame information Fr.

The memory receiver REC_M receives first referred information Ref from the server S and second referred information Ref' from the second server. Both are stored into the storage of the memory MEM with as retrieval reference the reference of its respective URL.

In the event when the memory MEM receives a referred information request e.g. REQ_Ref that comprises a reference to the URL of the referred information Ref, the checker CH checks the presence of this reference to this URL. When the reference of this URL is present in the storage of the memory MEM, the associated referred information Ref is retrieved from the storage and is transmitted to the terminal T.

In the following paragraphs it is explained which steps are executed, according to the present invention, in the event when a user clicks on a HTML page that is shown on the display of its terminal. In the event when a user of the terminal desires to download an HTML page, the browser on the terminal determines the selected URL Uniform Resource Locator of the frame information Fr. The browser of the terminal T generates a frame information request REQ_Fr that comprises a reference to an URL. The request REQ_Fr is forwarded to the memory MEM. The checker CH of the memory checks upon the presence of the frame information in the storage of the memory MEM. Presume that the frame information Fr is not yet available in the memory MEM. The memory MEM forwards the request REQ_Fr to the server S. The server receiver REC_S receives the request and reacts with a double action. The first action is to retrieve the frame information Fr from its storage and to forward it to the server transmitter TR_S. The second action is to activate the commander COM by forwarding also the frame information Fr to the commander COM. The commander COM retrieves references to other information from the frame information Fr and generates for each found reference a transmission comm and. Presume that two references are found. The first reference is a reference to referred information Ref that is stored in the storage of the server S itself. Here for the transmission command Com results in retrieving the referred information Ref from the storage of the server S and forwarding it to the server transmitter TR_S. The second reference is a reference to referred information Ref' that is not stored in the storage of the server itself. Therefore, the transmission command Com' is forwarded to the respective server that comprises this referred information Ref'. This second server executes the command and transmits the referred information Ref' on top of UDP to the memory MEM for storage. In parallel the server transmitter TR_S transmits the frame information Fr on top of TCP, and the referred information Ref on top of UDP to the memory MEM for storage.

The memory MEM receives the frame information Fr and takes a copy of it for its storage before further forwarding it to the terminal T.

Presume than, while the frame information Fr is being received from the memory by the browser of the terminal T, the reference to referred information Ref is found. The browser of the terminal desires to complete the HTML page and generates, therefore, a referred information request REQ_Ref. The memory MEM receives this request and the checker CH of the memory MEM checks upon the presence of the referred information Ref in the storage of the memory MEM. In contrast to the prior art solution where the referred information Ref should only be present according to particular situations the referred information Ref always is present in the storage of the memory MEM unless a transmission fault happened. The referred information Ref is transferred to the browser of the terminal T whereby the browser is enabled to complete its HTML page and thereby its task for the user of the terminal T.

Finally it has to be remarked that also the preferred embodiment describes an implementation whereby the memory means MEM is comprised in a proxy server, it is evident to a person skilled in the art that the above description might be adapted to other implementations whereby the memory means is comprised in the terminal itself.

While the principles of the invention have been described above in connection with specific apparatus, it is to be clearly understood that this description is made only by way of example and not as a limitation on the scope of the invention, as defined in the appended claims.

What is claimed is:

1. A method to provide information (INF) in an internet telecommunication network from a server (S) to a terminal (T) of a user, said method comprising the steps of sending a frame information request (REQ_Fr) from said terminal (T) to said server (S) requesting transmission of frame information (Fr) in said information (INF), said frame information (Fr) comprising at least one reference to referred information (Ref) of said information (INF), and upon reception of said frame information request (REQ_Fr), transmitting said frame information (Fr) to said terminal (T), characterized in that said method further comprises the steps of:

responding, by said server(S), to reception of said frame information request (REQ_Fr) by retrieving, by a command generator (COM) inside said server (S), from said frame information (Fr) said at least one reference to referred information (Ref), commanding transmission, by the command generator (COM) inside said server(S), of at least said referred information (Ref) according to said reference towards a memory (MEM), associated with said terminal (T), via a channel different from the channel used for transmission of said frame information (Fr), and by receiving said referred information (Ref) by said memory (MEM) via said different channel, thereby enabling said terminal (T) to find said referred information (Ref) at said memory (MEM) upon requesting said referred information (Ref) from said memory (MEM) after having received at least part of said frame information (Fr).

2. A server (S) to provide information (INF) in an internet telecommunication network from said server to a terminal (T) of a user, said server (S) comprising:

a server receiver (REC_S) receiving a frame information request (REQ_Fr) from said terminal (T) requesting transmission of frame information (Fr) included in said information (INF), said frame information (Fr) comprising at least one reference to referred information (Ref) of said information (INF) being related to said frame information (Fr); and a server transmitter (TR_S), coupled to said server receiver (REC_S), to transmit, upon reception of said frame information request (REQ_Fr), said frame information (Fr) to said terminal (T), characterized in that said server (S) further comprises, inside said server, a command generator (COM) to command, upon reception of said frame information request (REQ_Fr), transmission, of at least said referred information (Ref) according to said reference, towards a memory (MEM), associated with said terminal (T), via a channel different from the channel used for transmission of said frame information (Fr), in order to thereby enable reception of said referred information (Ref) by said memory (MEM) via said different channel and to enable said terminal (T) to find said referred information (Ref) at said memory (MEM) when requesting said memory (MEM) for said referred information (Ref) after having received at least part of said frame information (Fr).

3. The server (S) according to claim 2, characterized in that said command generator (COM) is further adapted to command said transmission of at least said referred information (Ref) towards a second server in order to enable said second server to transmit said referred information (Ref) according to said reference directly to said memory (MEM).

4. The server (S) according to claim 2, characterized in that said different channel is realized according to a User Datagram Protocol.

5. A memory (MEM) to enable provision of at least part of information (INF) in an internet telecommunication network from a server (S) according to claim 2, to a terminal (T) of a user, characterized in that said memory (MEM) comprises a receiver (REC_M) to receive said referred information (Ref) via said different channel.

6. The memory (MEM) according to claim 5, characterized in that said different channel is realized according to a User Data Protocol.

7. The memory (MEM) according to claim 5, characterized in that said memory (MEM) is included in said terminal (T).

8. The memory (EM) according to claim 5 characterized in that said memory (MEM) is included in an intermediate equipment such as a proxy server between said terminal (T) and said server (S).

9. The memory (MEM) according to claim 5, characterized in that said referred information (Ref) is received via an interface different from the interface used for reception of said frame information (Fr).

10. An internet telecommunication network for providing information (INF) from a server (S) to a terminal (T) of a user, characterized in that said network comprises at least one of a server (S) and a memory (MEM) associated with said terminal (T), said server comprising:

a server receiver (REC_S) receiving a frame information request (REQ_Fr) from said terminal (T) requesting transmission of frame information (Fr) included in said information (INF), said frame information (Fr) comprising at least one reference to referred information (Ref) of said information (INF) being related to said frame information (Fr); and a server transmitter (TR_S) coupled to said server receiver (REC_S) to transmit, upon reception of said frame information request (REQ_Fr), said frame information (Fr) to said terminal (T), said server (S) further comprising, inside said server, a command generator (COM) to command, upon reception of said frame information request (REQ_Fr), transmission of at least said referred information (Ref), according to said reference, towards said memory (MEM) via a channel different from the channel used for transmission of said frame information (Fr), in order to thereby enable reception of said referred information (Ref) by said memory (MEM) via said different channel and to enable said terminal (T), that is associated with said memory (MEM), to find said referred information (Ref) at said memory (MEM) upon requesting said memory (MEM) for said referred information (Ref) after having received at least part of said frame information (Fr), said memory comprising a receiver (REC_M) to receive said referred information (Ref) via said different channel.

* * * * *